(12) United States Patent
Pugh et al.

(10) Patent No.: US 10,401,524 B2
(45) Date of Patent: *Sep. 3, 2019

(54) REFLECTIVITY AND FRACING

(71) Applicant: Deep Imaging Technologies, Inc., Tomball, TX (US)

(72) Inventors: Trevor Keith Charles Pugh, Tomball, TX (US); Robert Michael Payton, The Woodlands, TX (US)

(73) Assignee: Deep Imaging Technologies, Inc., Tomball, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/968,582

(22) Filed: May 1, 2018

(65) Prior Publication Data

US 2018/0252833 A1  Sep. 6, 2018

Related U.S. Application Data

(62) Division of application No. 14/593,741, filed on Jan. 9, 2015, now Pat. No. 9,983,325.

(60) Provisional application No. 61/925,560, filed on Jan. 9, 2014.

(51) Int. Cl.
*G01V 3/08* (2006.01)
*E21B 43/26* (2006.01)
*G01V 3/12* (2006.01)

(52) U.S. Cl.
CPC ............ *G01V 3/083* (2013.01); *E21B 43/26* (2013.01); *G01V 3/12* (2013.01)

(58) Field of Classification Search
CPC .......... E21B 43/26; G01V 3/12; G01V 3/083
See application file for complete search history.

(56) References Cited

U.S. PATENT DOCUMENTS

| 6,545,945 | B2* | 4/2003 | Caulfield | G01N 29/348 |
| | | | | 342/22 |
| 7,872,944 | B2 | 1/2011 | Eisner et al. | |
| 9,983,325 | B2* | 5/2018 | Pugh | G01V 3/083 |
| 2011/0272147 | A1* | 11/2011 | Beasley | E21B 43/26 |
| | | | | 166/250.1 |
| 2012/0179372 | A1 | 7/2012 | Kalish | |
| 2014/0239956 | A1 | 8/2014 | Hoversten et al. | |
| 2015/0081219 | A1 | 3/2015 | Pugh et al. | |

FOREIGN PATENT DOCUMENTS

WO   2013173782 A1   11/2013

* cited by examiner

*Primary Examiner* — Yong-Suk Ro
(74) *Attorney, Agent, or Firm* — Schafer IP Law (57) ABSTRACT

A system and method allows determining the movement of subsurface fluids, gases or solids in the subsurface structure of interest. This allows quantitatively determining the results of surface and subsurface equipment and materials changes. These simple observations may result in significant improvements in field efficiency.

20 Claims, 12 Drawing Sheets

REFLECTIVITY AND FRACING

TECHNICAL FIELD

The invention relates to devices and processes for geophysical prospecting, subsurface fluid monitoring and, more particularly, the types of information that can be developed from the data collected by a Controlled Source Electromagnetic (CSEM) using designed transmission waves and precise timing.

BACKGROUND ART

The currently available techniques for determining the movement of fluid and proppant (sand) into or through a subsurface formation rely on secondary measurement techniques such as Micro Seismic or modeling, neither of which can show where the fluid or proppant has been injected, and only infer the location. Micro Seismic Monitoring ("MSM") and is typified by U.S. Pat. No. 7,872,944 and is incorporated herein by reference.

"System and method for detecting a fracture in a rock formation using an electromagnetic source," U.S. Pat. Pub. 20140239956, is incorporated herein by reference and is an example of an attempt to define the process through modeling but does not define how such a system would operate in the real world and makes several errors of omission as described in "Coherent transmit/receive bi-static electromagnetic geophysical tomography system," U.S. patent application Ser. No. 14/491,113, filed Sep. 19, 2014, and published Mar. 19, 2015 as U.S. Pat. Pub. No. 20150081219, which is incorporated herein by reference.

The current state of the art in Hydraulic Fracturing (fracing) bases a fracing program around experience gained from methods used previously, modeling the expected stress profile of the area and many other modeled factors. This results in a recipe book approach to fracturing that is variously successful. An indication of the effectiveness of this technique is the statistic that fracing is only about 40-50% successful in producing usable reserves.

The current state of the art for flow back operation is not to monitor them at all with techniques that might reveal the subsurface activity. More typically the monitoring of the flow back operation involves reviewing pressure, temperature and flow rate data and the quality of the fluid arriving at the well head.

The current state of the art for Enhanced Oil Recovery (EOR) is to monitor the process through various techniques that try to understand which of the Hydraulic Fracture (fracs) stages were successful and are producing in order to customize the fluid or gas injection locations and rate.

The current state of the art in long term monitoring of known reserves is to use modeling, in-hole measurements of temperature and pressure and surface readings of pressure, flow and temperature.

SUMMARY

A system and method allows determining the movement of subsurface fluids, gases or solids in the subsurface structure of interest. This allows quantitatively determining the results of surface and subsurface equipment and materials changes. These simple observations may result in significant improvements in field efficiency.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

The techniques described below typically employ a system such as is described in U.S. patent application Ser. No. 13/187,759, filed Jul. 21, 2011, and published Jul. 12, 2012 as U.S. Pat. Pub. No. 20120179372; U.S. Provisional Patent Application No. 61/684,347, filed Aug. 17, 2012; PCT Patent Application No. PCT/US2013/041691, filed May 17, 2013, and published Nov. 21, 2013 as International Pub. No. WO2013173782; and U.S. patent application Ser. No. 14/491,113, filed Sep. 19, 2014, and published Mar. 19, 2015 as U.S. Pat. Pub. No. 20150081219; all of which are incorporated by reference herein in their entirety.

Improved techniques for monitoring and describing the movement of fluids, gases and solids within a subsurface structure of interest for each of the stages of an oil and gas wells life are disclosed below. These stages are typically described in the following activities that occur over the life of an oil and gas wellbore: (a) Fracing, (b) Flow Back, (c) EOR, (d) long term monitoring of reservoir depletion, and (e) re-fracing. There are other borehole types that also use some or all of these techniques that may also benefit from the system and method contained herein. Embodiments described herein provide some level of surety that the fluids, gases and solids being injected into the subsurface structure of interest are contained within the prescribed fluid column, structures avoid any potential pollution of valuable water resources, and failure of the well through water incursion from another source is prevented.

A person familiar with oil field operations would understand fracing, Flow Back, EOR and reservoir monitoring operations. Each of these operations occurs subsurface. In the interests of brevity, fracing, Flow Back, EOR, and long term reservoir monitoring are referred to below as "subsurface operations."

Figure 1:
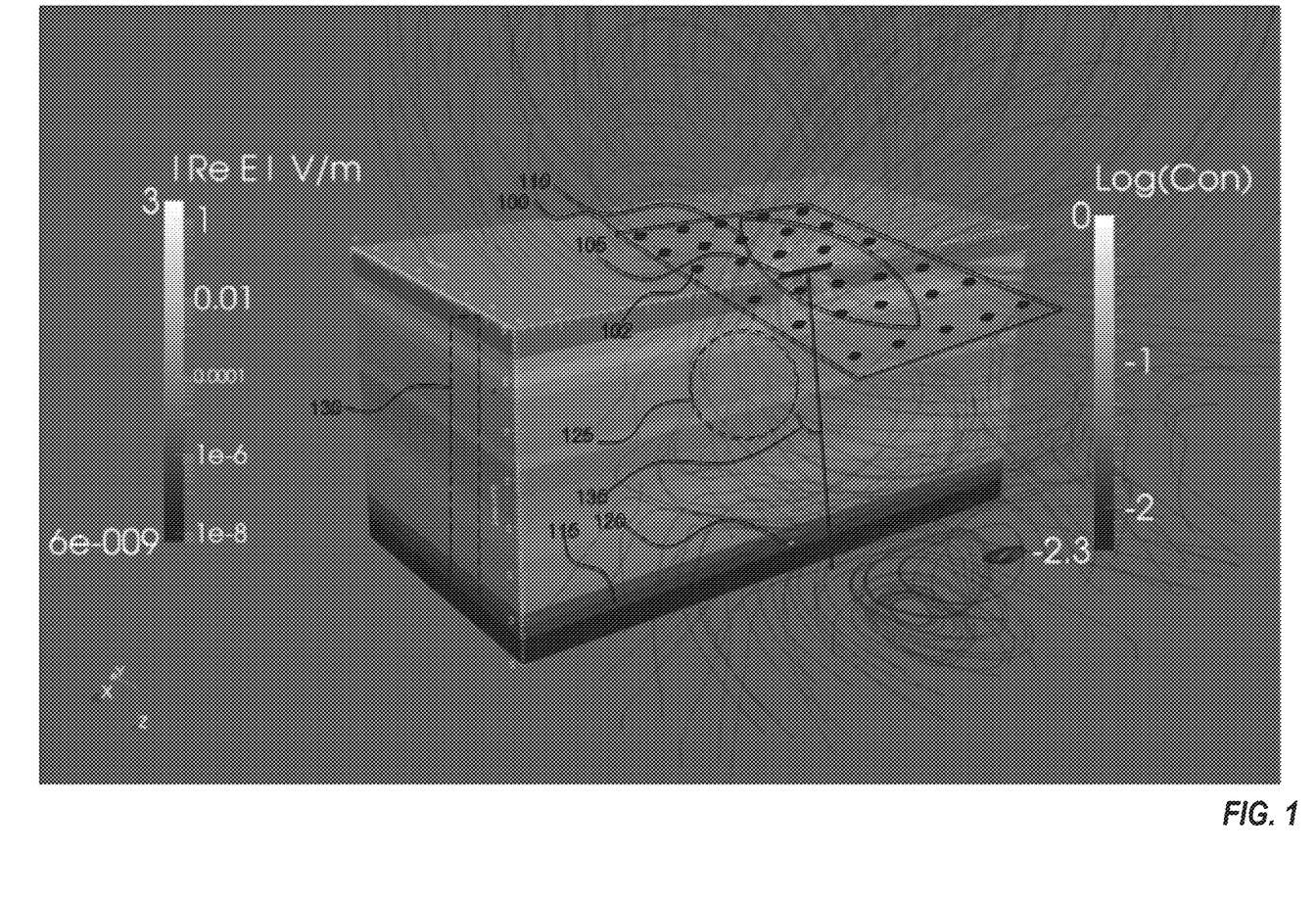
FIG. 1 depicts one surface layout relative to a fracturing location subsurface, the intervening layers of the model and the primary field of the modeled system.
Figure 3:
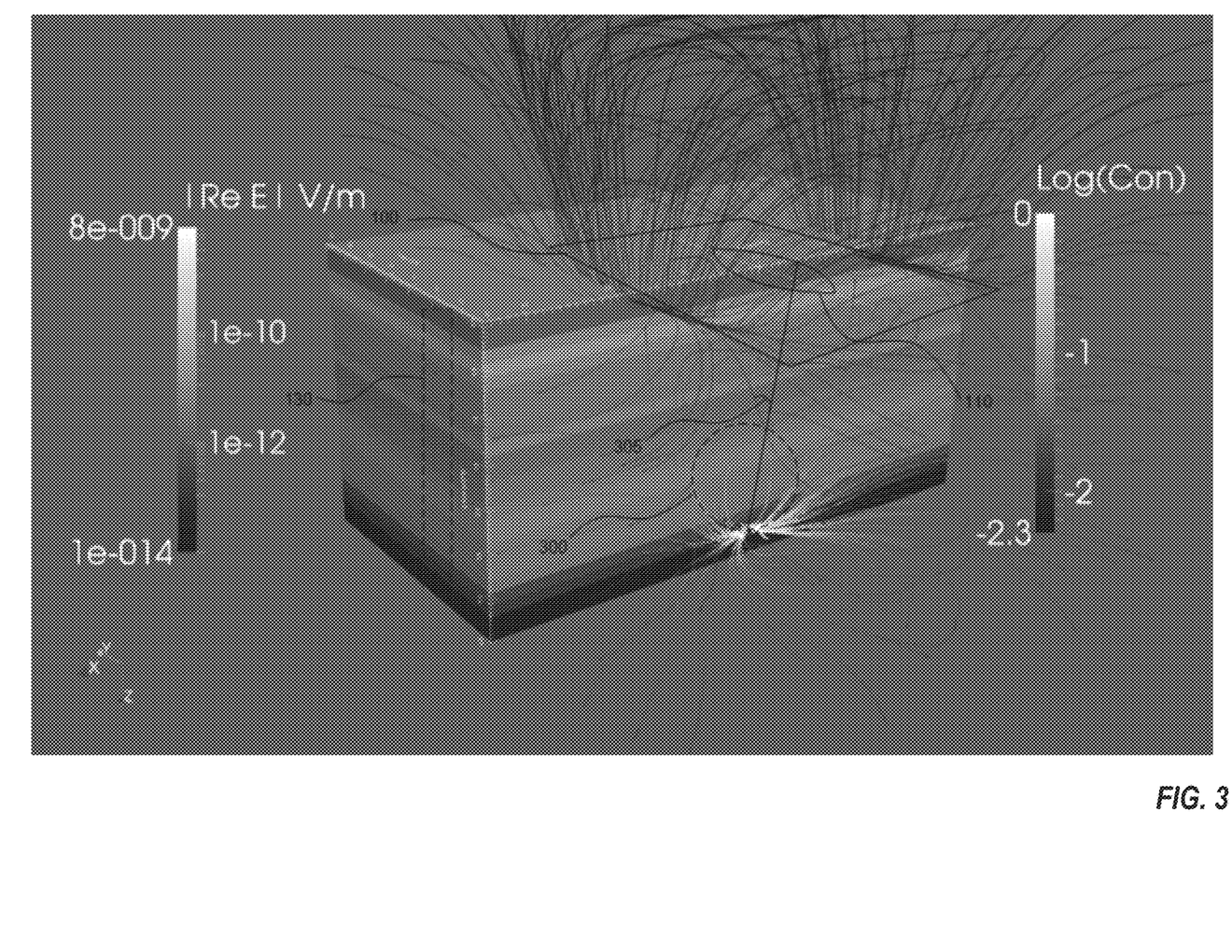
FIG. 3 depicts a horizontal surface modeled signal response of the secondary surface difference field at the onset of a subsurface operation that will change the impedance in subsurface structures.

Referring now to FIG. 1, in one embodiment the receiver array 100 is placed immediately adjacent to the transmitter system 105. The transmitter system 105 and the receiver array 100 are placed in an area where forward modeling has indicated there will be a signal present in the secondary surface field 110. The concept of a forward model will be understood by someone skilled in the art of modeling geophysical electromagnetic systems. The receiver array 100 is placed immediately above the subsurface structure of interest 115 that contains the area where the subsurface operation 120 is to be performed, for example a frac. The primary field lines 125, generated by the transmitter system 105 are greatly affected by the intervening layers 130 as they progress to the subsurface structure of interest 115. A forward modeled secondary field is depicted in FIG. 3a.

The forward model typically indicates the location on the surface where the receiver array 100 can reasonably be expected to pick up a signal that indicates that a subsurface operation 120 is underway. This position is typically directly above the subsurface location where a subsurface operation is being performed.

The transmitted signal 125 passes through multiple layers 130 that are variously opaque to the EM signal being transmitted. The process is described in detail in "Coherent transmit/receive bi-static electromagnetic geophysical tomography system" U.S. patent application Ser. No. 14/491,113.

The close proximity of the receiver array 100 to the transmitter system 105 is a layout of a Controlled Source Electromagnetic (CSEM) system that has not been envisioned previously. The layout sets the limit of surface receiver array 100 location to be less than or equal to the extent of the modeled secondary surface field 110. The angle between the subsurface midpoint between each of the plurality of receivers 102 and the transmitter system 105 should be as small as possible. There are situations where forward modeling can indicate that the receiver array 100 must extend beyond the extent of the subsurface operation due to intervening subsurface layers that cause an apparent shift in the surface image. More generally, the receiver array 100 is placed close to the transmitter system 105 and not in the far field as other CSEM methods require.

The one or more transmitter systems 105 are used to transmit a designed waveform that generates the primary field lines 125. The transmitted waveform is highly attenuated and dispersed through the intervening layers 130 to the subsurface structure of interest 115. Overall, the intervening layers 130 are of increasing impedance as depth increases. In general, this leads to a signal that is mostly bent outward 125 and away from the subsurface structure of interest 115 and the subsurface operation 120. However, a signal that has a small initial angle 135 will travel toward the structure of interest 115 with reduced bending.

The proximity of the transmitter system 105 to the receiver array 100 requires a further step to remove the "head wave" or direct wave data from the signals as described in U.S. patent application Ser. No. 14/491,113. The image created from the receiver array 100 that is a difference signal from the subsurface location of interest, is in the horizontal plane. Further processing as described in U.S. patent application Ser. No. 14/491,113, may be required to obtain depth data in the vertical axis.

Figure 2:
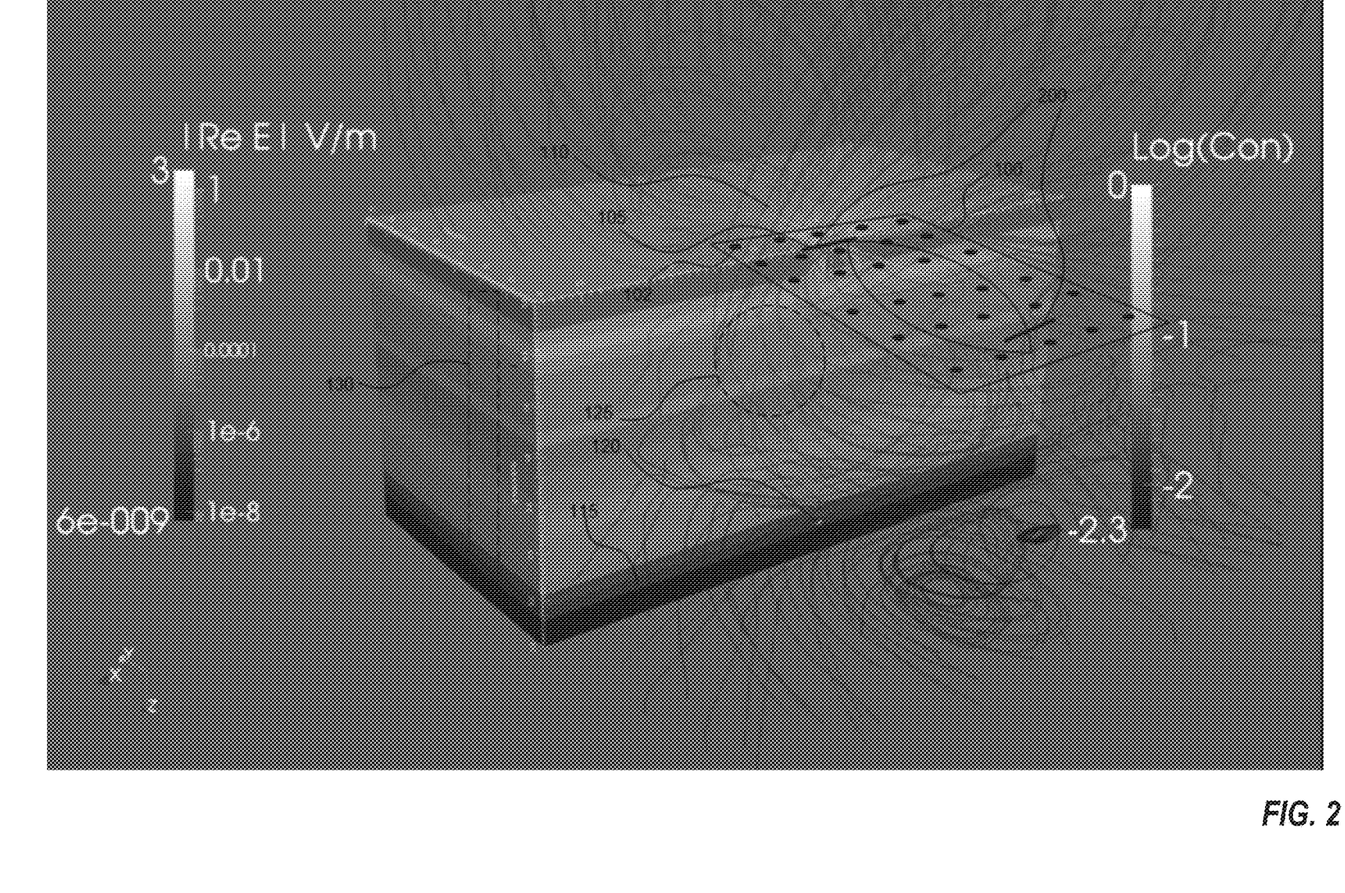
FIG. 2 depicts an alternate surface layout that allow the receivers to be placed immediately above the subsurface structures that will be changing during a subsurface operation in the area of interest.

FIG. 2 illustrates an alternate embodiment in which two transmitters used to form a transmitter array 200. Two transmitter systems 105 are placed on each side of the receiver array 100. The receiver array 100 is now placed directly above the location of the subsurface operations 120. The subsurface operation 120 can now be completely imaged as the embodiment overcomes the restriction of placing the receivers far enough away from the transmitter system 105 such that the signal measured at the receiver array 100 does not exceed the full scale value at minimum gain of each receiver 102 in the receiver array 100. Each transmitter in the transmitter array 200 is synchronized to ensure that a coherent wave-front travels to the subsurface area of interest. The receivers can be placed immediately above the subsurface structures that will change impedances during a subsurface operation.

A further embodiment adds a plurality of transmitter systems 105 to the transmitter array 200 allowing the ability to create a phased array transmitter and also to control the polarization of the transmitted signal.

Another embodiment allows for each of one or more transmitter systems 105 in the transmitter array 200 to create a wave that is orthonormal to all other waves transmitted.

Referring now to FIG. 3 the secondary response field 110 returns through the various intervening layers 130 to the surface. Because the impedance is generally dropping as the signal progresses toward the surface the secondary field 300 is collimated toward the receiver array 100, reducing the outward bending effect indicated in FIG. 1. The surface secondary response field 110 is created from the primary field 125. As illustrated in FIG. 3, the signals return with a very small angle 305 relative to the distance travelled and the distribution of the receiving array 100 defines the resolution of the image in the horizontal plane. The surface secondary response field 110 is fixed if there are no changes in subsurface impedance.

Figure 4:
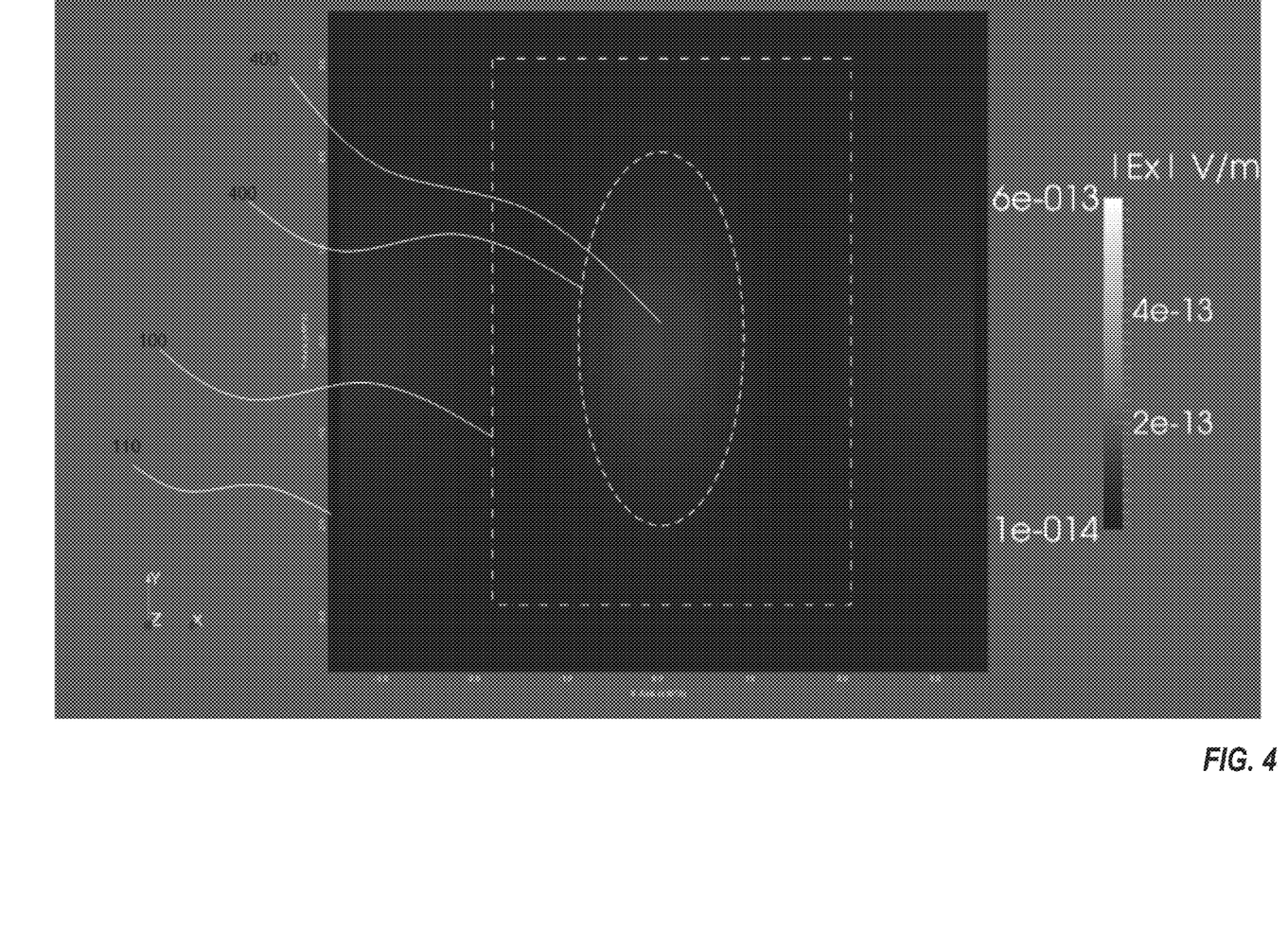
FIG. 4 depicts a horizontal surface modeled signal response of the secondary surface difference field that indicates that the response increase as impedance changes in subsurface structures.

Referring now to FIG. 4, when the subsurface impedance changes within the subsurface structure of interest 120, there is a proportionate change in the secondary surface field 110 as indicated by 400, measured by the receiver array 100. The system monitors and defines the stationary surface field 110 prior to any changes being caused within the subsurface structure of interest 120 by a subsurface operation, and then records the difference in the secondary surface field 400. In one embodiment, the surface secondary response field 110 is displayed in Volts per meter (V/m). The receiver array 100 measures voltage over some distance, typically 60 meters. There are gains in the modeled surface secondary field voltage distribution caused by including the subsurface lateral casing in the model. In one embodiment, the final surface field change is in the region of $5 \times 10^7$ V/m.

Figure 5:
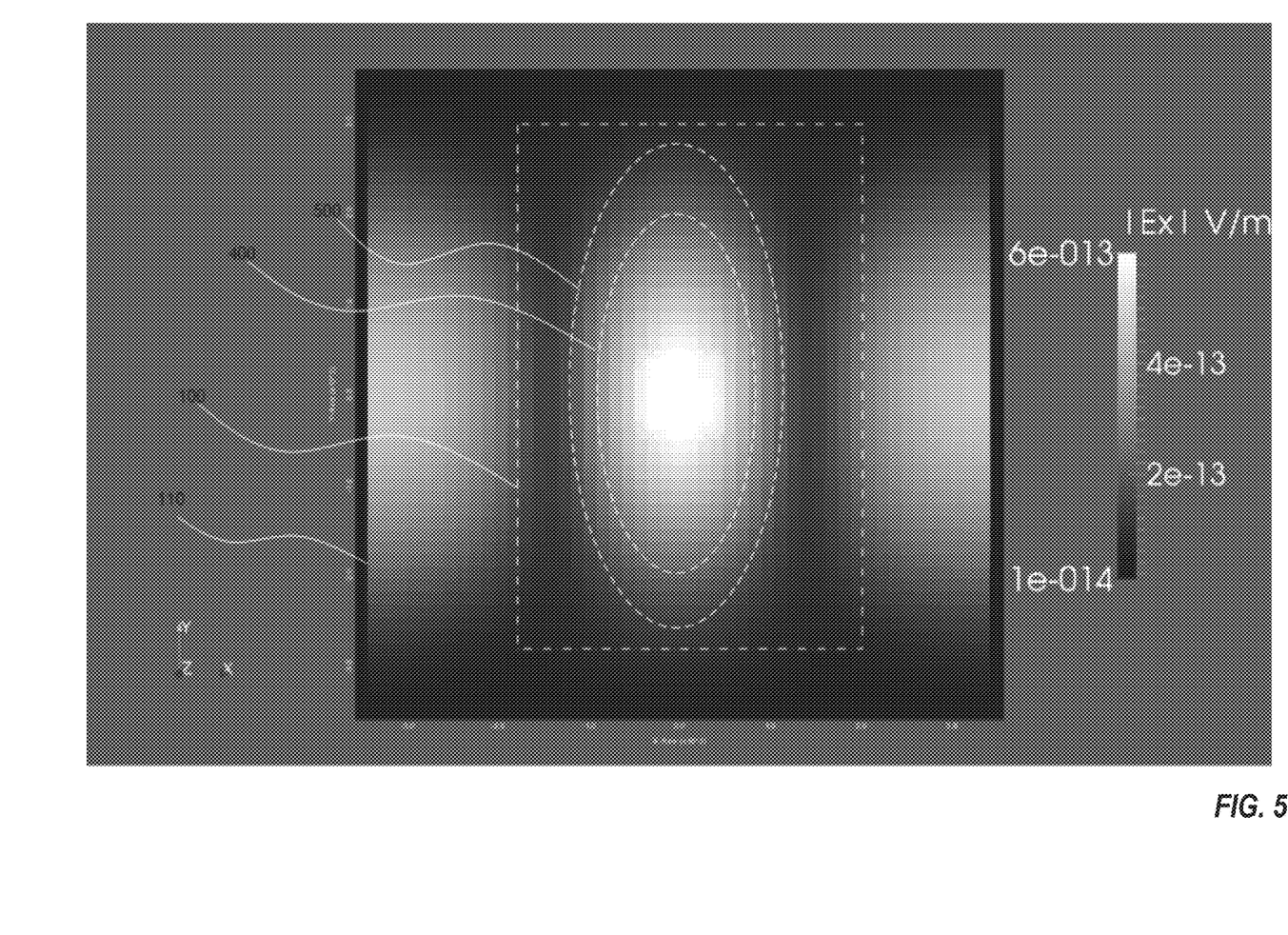
FIG. 5 depicts an amplitude ratio plot for each frequency monitored by the system, distributed over the surface receiver array from one fracing operation.

Referring now to FIG. 5, as impedance in the subsurface structure of interest 115 changes the secondary surface field 400 recorded by the receiver array 100 continues to change proportionately. By depicting these changes in a time series of frames of the difference between the starting secondary surface field 110 through the final secondary field 500, an understanding of the progress of subsurface impedance changes can be obtained. In this instance, the forward model indicates that the subsurface layering results in an image magnification of approximately 5 times the subsurface operation area.

Figure 6:
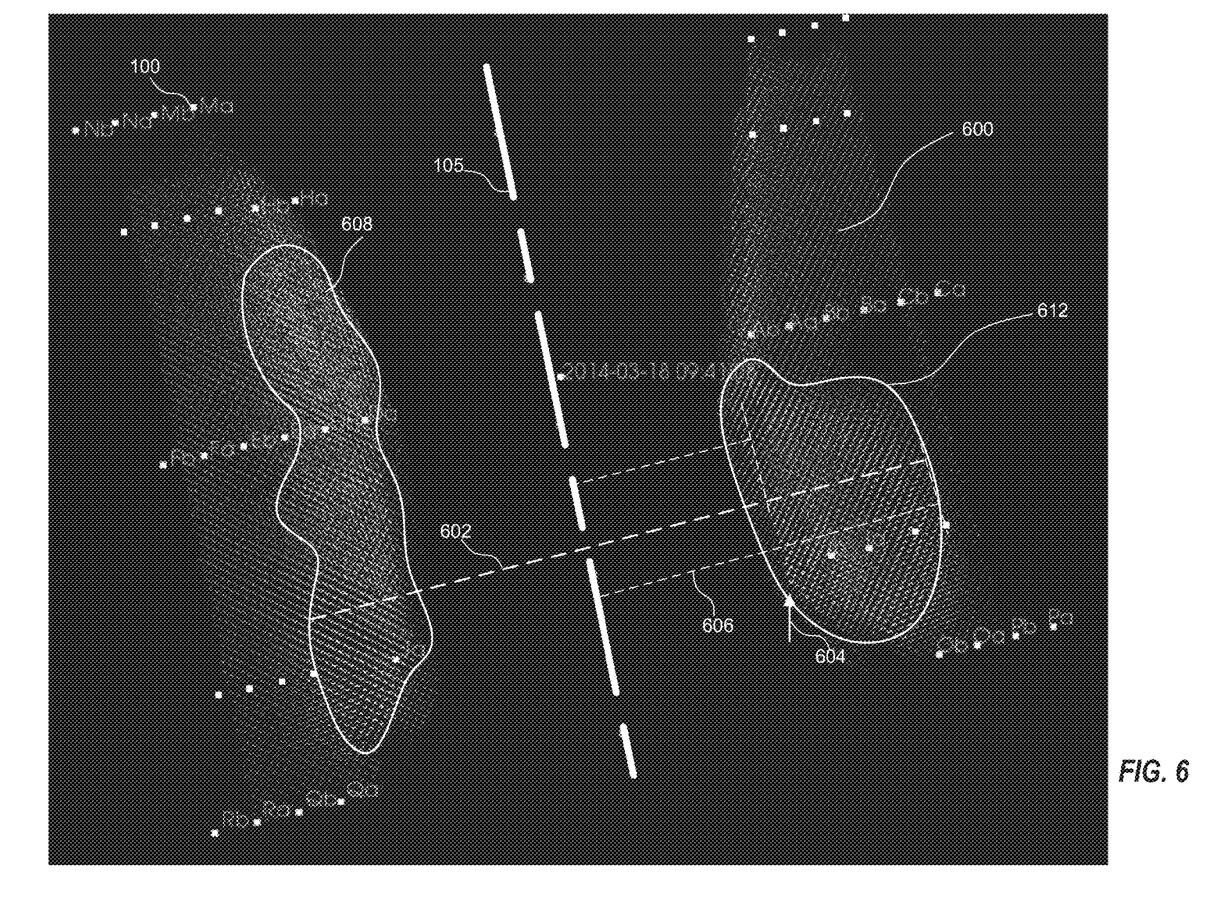
FIG. 6 depicts one frame of recorded amplitude ration data over the receiver field of a fracing operation.

Referring now to FIG. 6, in order to take advantage of the designed waveform transmitted by the transmitter system 105, the data received from the receiver array 100 is depicted as an amplitude ratio plot 600 for each frequency recorded by the system, distributed over the receiver array 100. A time lapse sequences of these images is created to indicate the changes that occur as a result of the subsurface operation. There are two areas of difference 612 and 608 in the image that change over time. The frac height 604 can be obtained by additional processing of the received data. The frac half-length 606 can be read directly from the amplitude ratio plot area of change 612 and 608. The total frac length 602 is the distance to the edge of the areas 612 and 608 The relationship between the modeled data depicted in FIGS. 3, 4, and 5 and the actual recorded data in FIG. 6 is clear and shows that modeling and data agree.

Once a series of time lapse images has been constructed of the amplitude ratio data, phase difference or cross correlation data, as defined in U.S. patent application Ser. No. 14/491,113, the operator can decide to alter operations to best suit conditions.

The amplitude ratio data is sensitive to overall changes in the subsurface impedance and also electro seismic events.

Figure 7A:
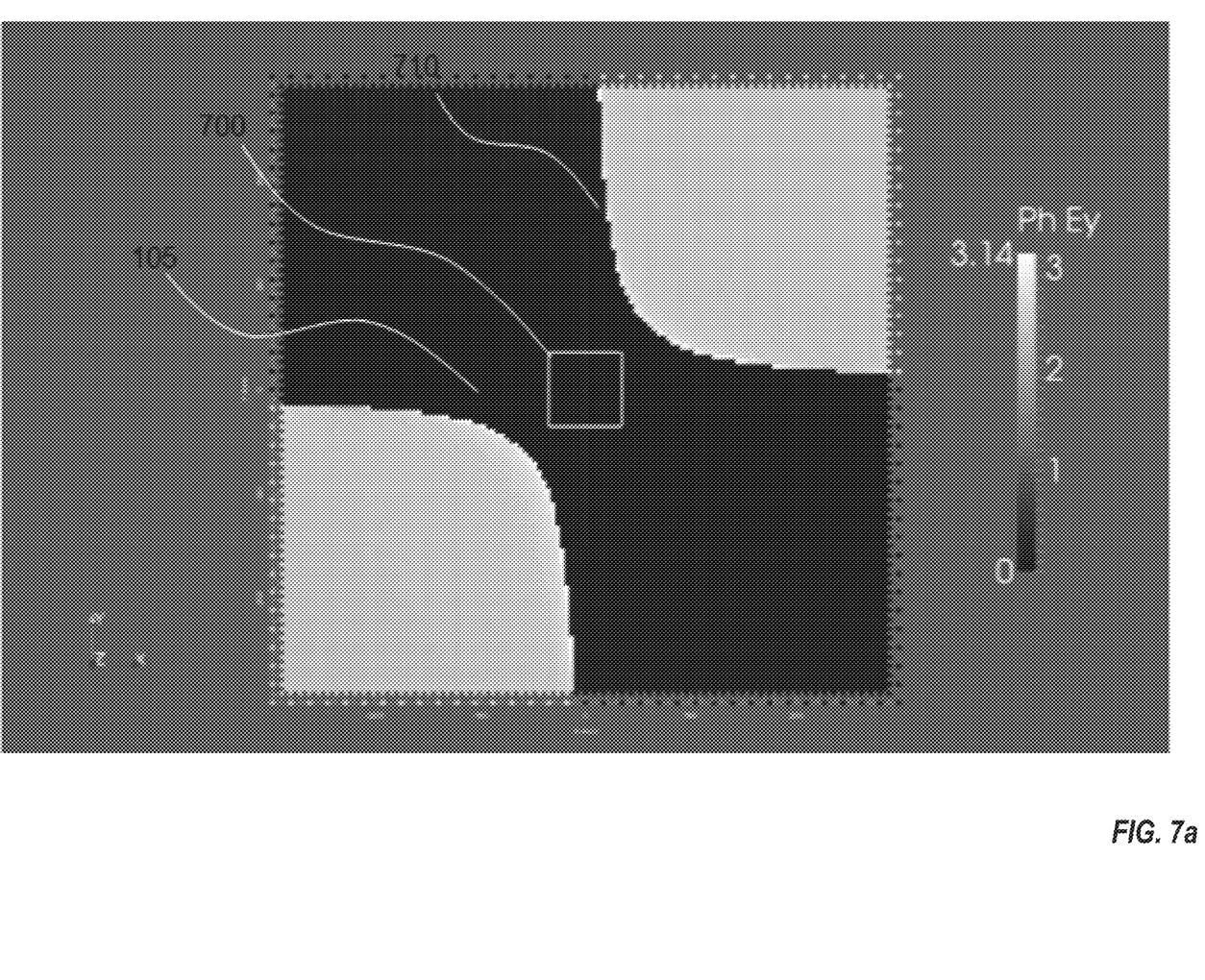
FIGS. 7a and 7b depict a phase difference response from a fracing operation.
Figure 7B:
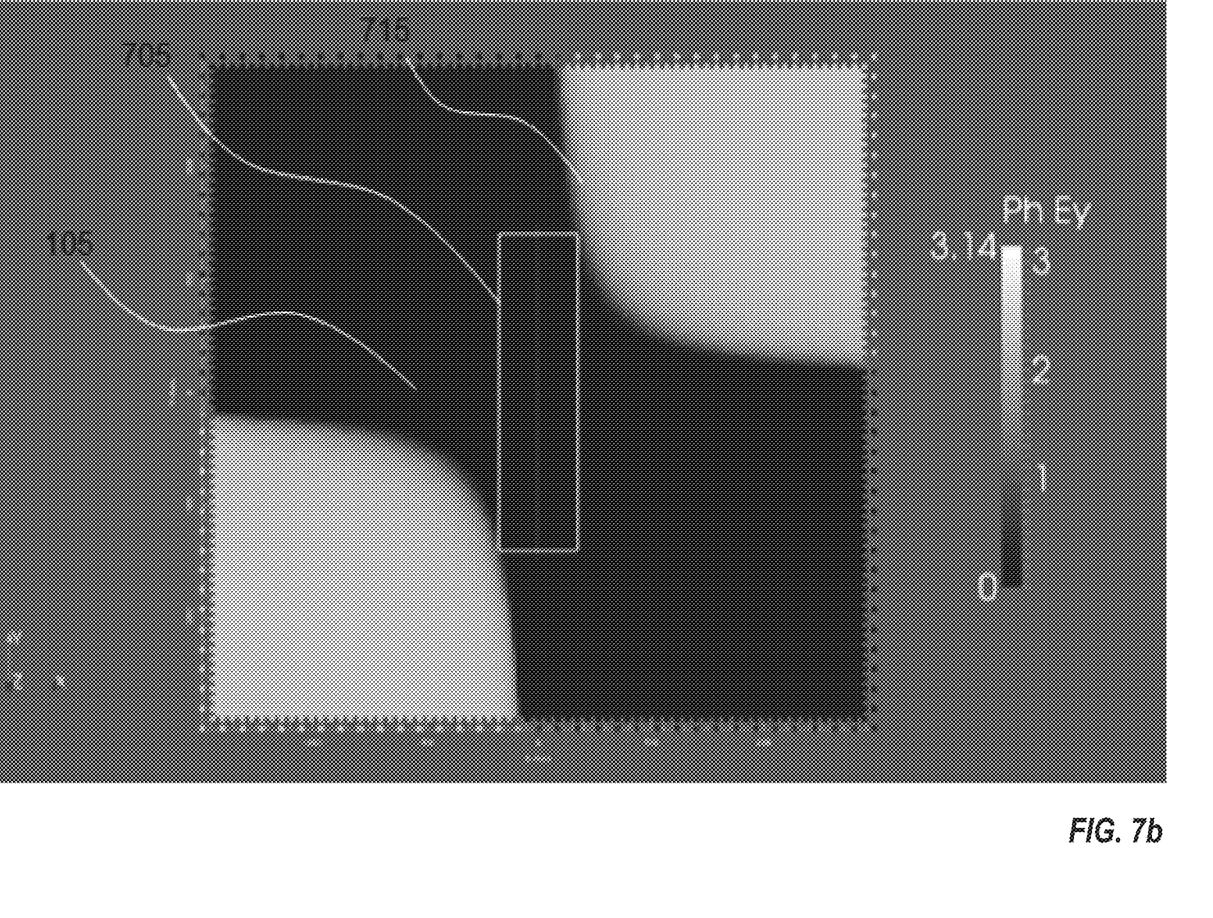

Referring now to FIGS. 7a and 7b, the phase difference in the Y axis (Y axis is defined as perpendicular to the transmitter system 105 antenna) data 700, is very sensitive to the passage of an impedance difference interface 705, through the subsurface structure of interest 115. The phase change 710, for a frequency that is reactive to the subsurface structure of interest is typically 180 degrees or pi radians. The phase sensitivity allows for a very accurate time and position indication of the location and extent of the frac 700 and 705 and more generally provides an indication of any impedance change in the subsurface structure of interest 115 in any of the sub surface operations.

Figure 8:
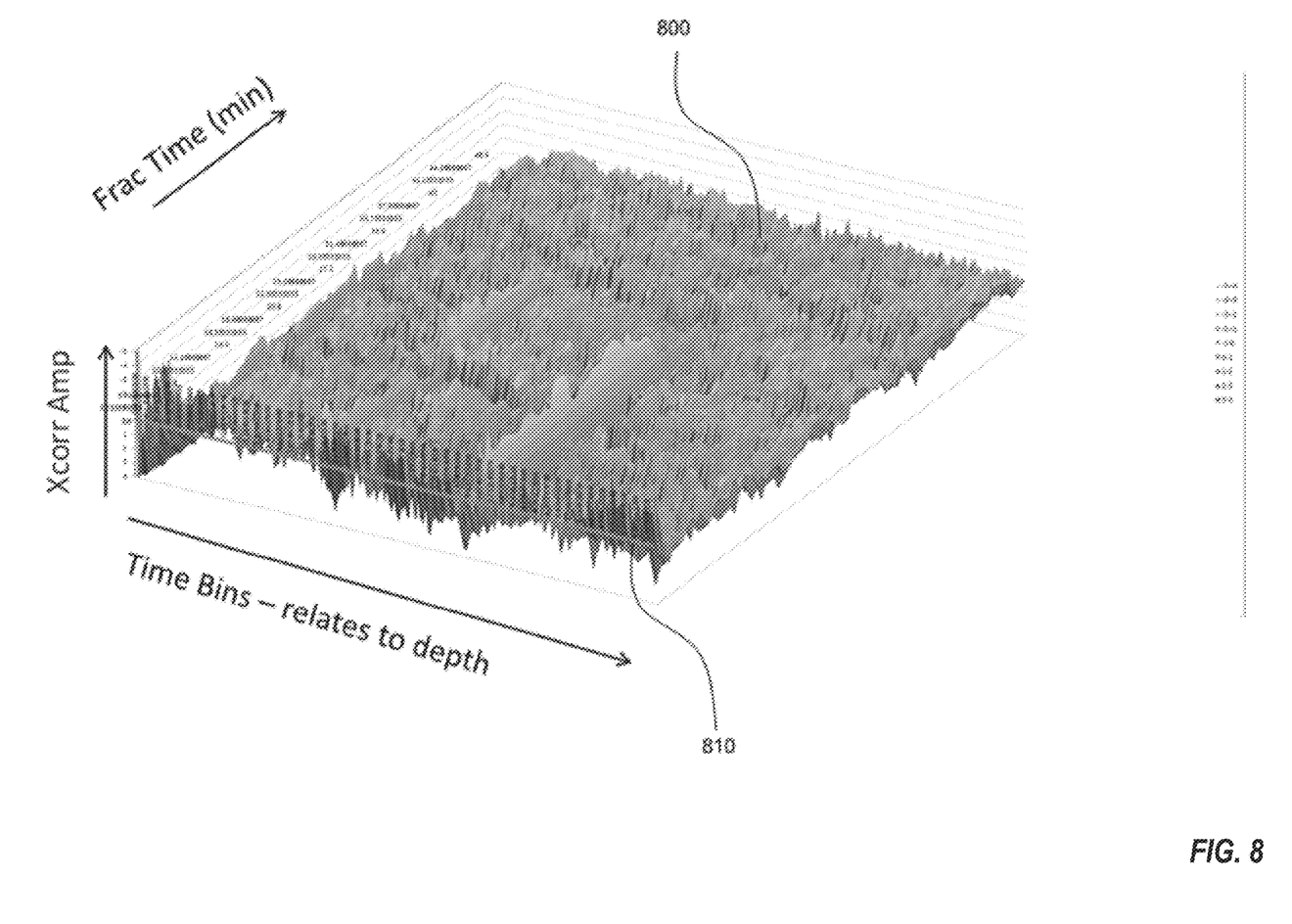
FIG. 8 depicts cross correlation data from a fracing operation.

Referring now to FIG. 8, using a designed waveform for transmission, the cross correlation 800 data has frequency content that arrives from a particular point in the three-dimensional (3D) space that is the subsurface structure that is distributed over one or more time bins 810 in the data. Time bins 810 and the designed waveform are as specified in U.S. patent application Ser. No. 14/491,113. When all echoes or multiple reflections have diminished to the noise floor then the cross correlation recorded over the receiver array 100 can be further manipulated to resolve the location of changes in subsurface impedance, allowing for the determination of a Z axis (vertical) extent of subsurface impedance changes.

Figure 9:
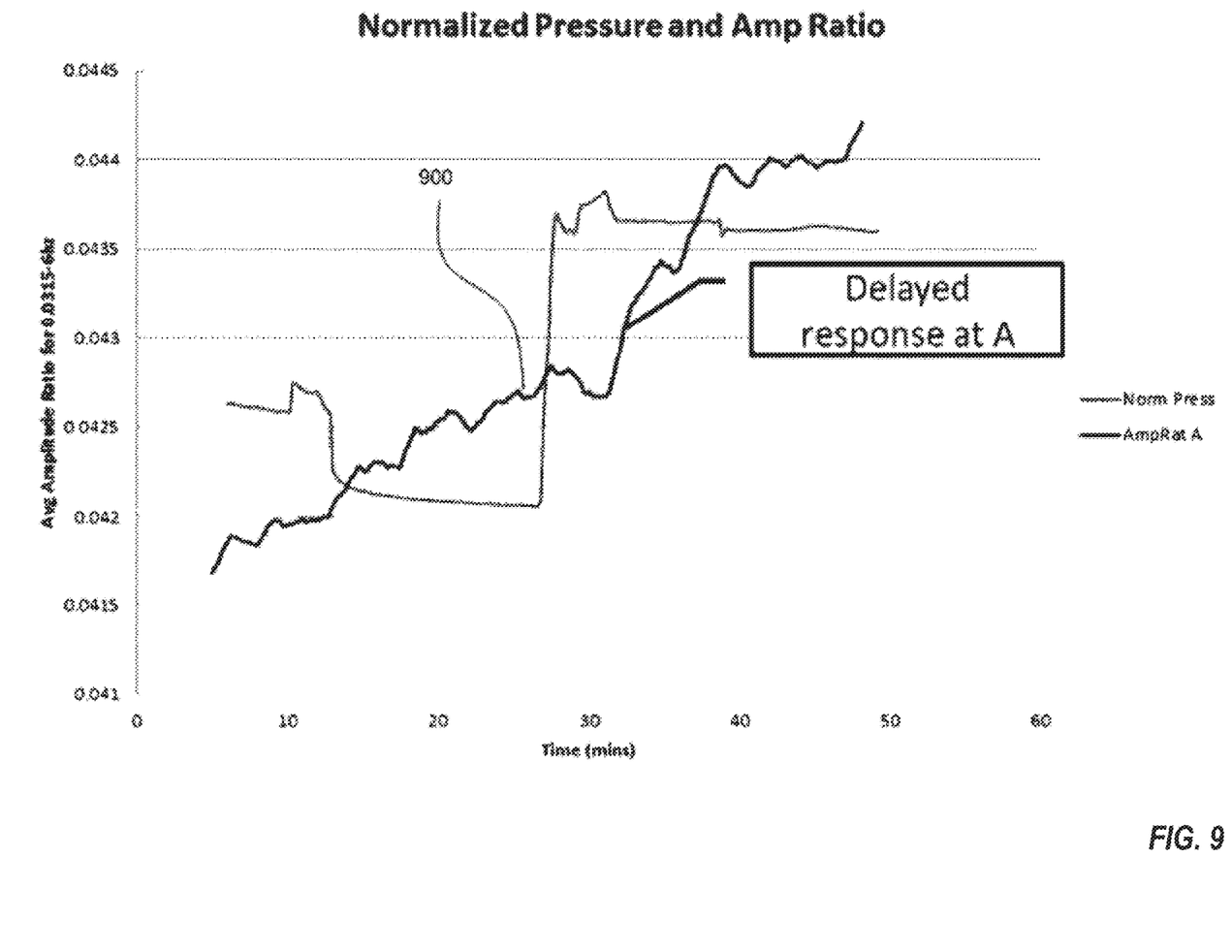
FIG. 9 depicts a graph of the sum of amplitude ratio values across a frequency range for multiple time steps over a period of a complete fracing operations.

There are several methods that can be used to reduce the data set into a representation of the subsurface change in impedance. Referring to FIG. 9; one method relies on the amplitude ratio of the transmitted and received data over the extent of the receiver array, being expressed as an average or sum or RMS value of the energy contained in a frequency range over successive time frames during recording operations. The sum results in a one dimensional trace 900 from each receiver location that is closely correlated to the changes in pressure and fluid pump rates recorded by the hydraulic fracturing operation. The chart depicted in FIG. 9 shows a delayed response at one of the receiver locations.

Figure 10A:
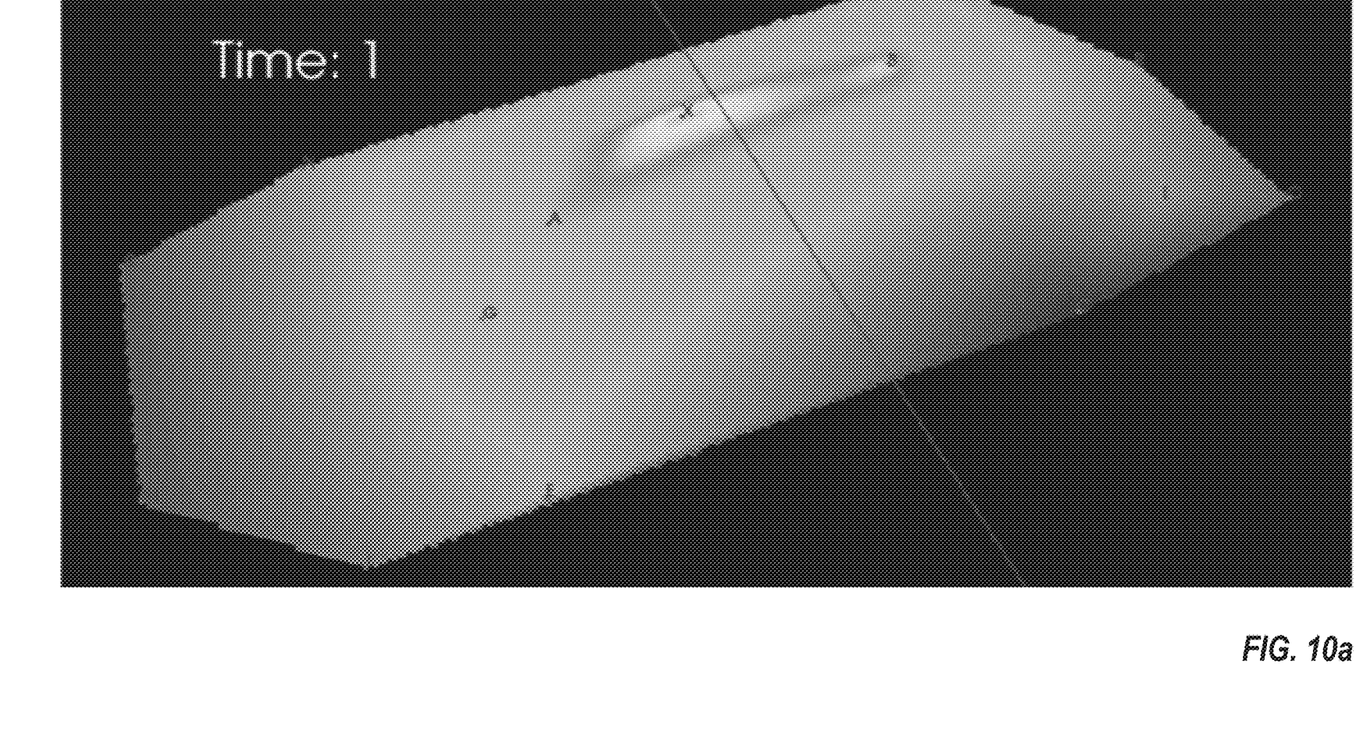
FIGS. 10a and 10b depict two time frames of recorded data from a fracing operation.
Figure 10B:
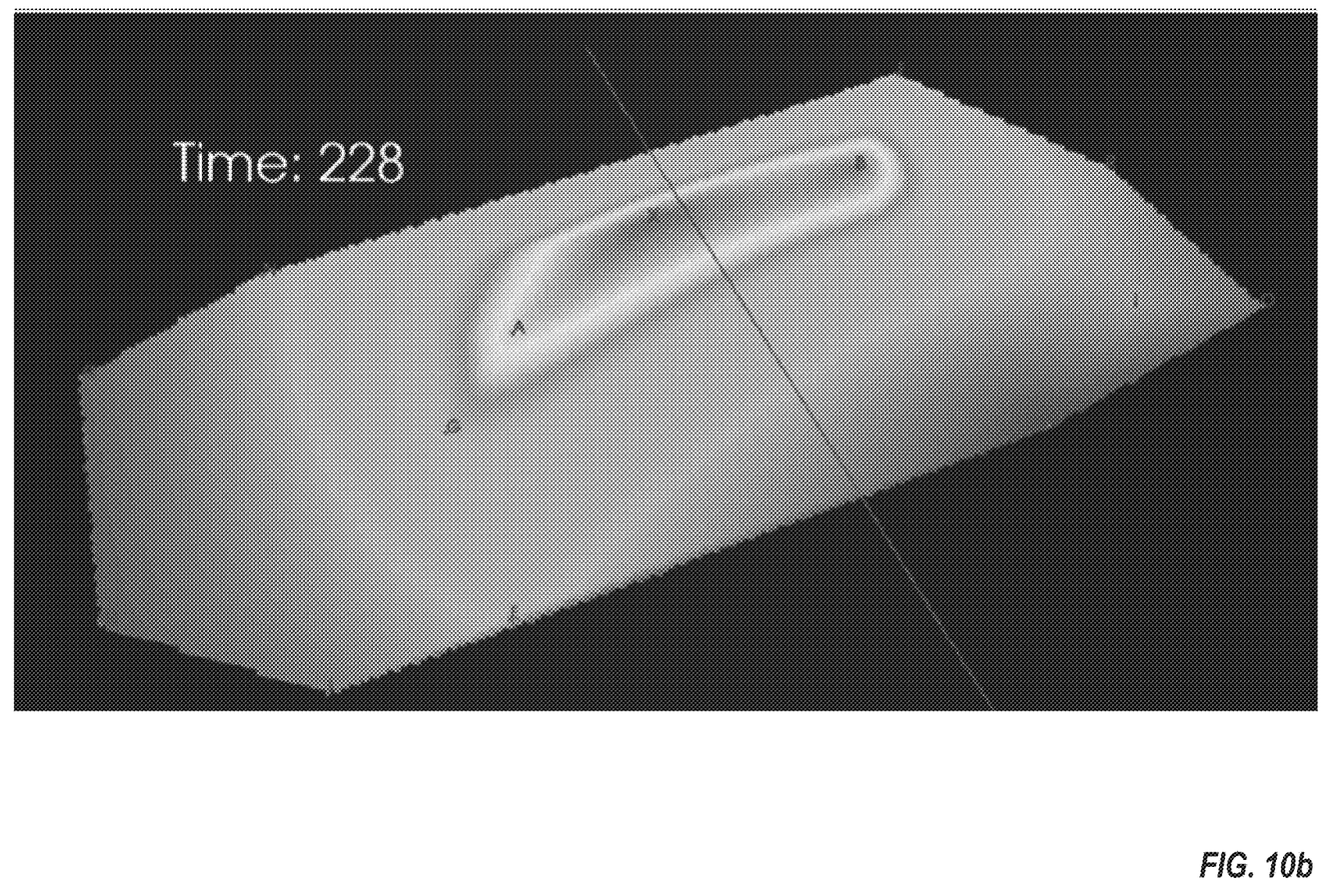

FIG. 10a is an image created from a series of traces, one for each receiver in the receiver array 100, from the start of a fracing operation. FIG. 10b is an image of the collected data 227 time steps later.

Considering the process of a fracing operation, the amount of fluid and proppant used in fracing and how long the fracing operation continues may be determined by the results created by the system in real time.

The amount of fluid and proppant that needs to be shipped to the site may be efficiently determined, as the operator directly interprets the state of the subsurface structure of interest as the operation progresses in real time, contemporaneously with the subsurface operation. In one example, that most operators prefer to over pump rather than pump too little fluid and proppant. The techniques described herein allow an operator to stop pumping when the planned extent of the fracing has been reached. The length of time an operation runs may thus be reduced, providing significant cost savings. The amount of fluid that has to be disposed may also be reduced, along with all the ancillary costs of using waste injection wells.

Linking or communication between fracs is usually taken to have occurred if a pressure signature is observed in adjacent wells. Referring again to FIG. 6, the techniques described herein allow the operator to determine if linking has occurred between adjacent well locations by directly observing the fluid location in each well's fracing location or fracing stage. In addition, the operator may observe directly if fluid has moved into adjacent fracing locations in the same well bore, as is indicated by 608.

Furthermore, the techniques described herein allow the operator to know if a particular fracing stage has been successful and allow for a decision to be made to either change the method of fracing for future stages or wells, or try to intervene in the current stage by adding materials that can control the direction of the frac. A failed fracing stage is indicated by there being no response in the area indicated by 600. The addition of other materials to the fracing fluid and proppant can be understood by a person skilled in the art of fracing operations. The fluid and proppant are known as the "slurry."

Again referring to FIG. 6, the operator can choose to remodel the fracing program with the new data provided by the techniques described herein. There are several parameters that can be provided by the envisioned techniques. These are (a) half fracing length 606, defined as the distance from the perforation in the casing to the furthest extent of the fracing fluid or fracing slurry; (b) fracing height 604, defined as the vertical height of the fracing fluid or fracing slurry extent; (c) fracing volume is the fracing surface area 612 multiplied by the fracing height 604, or producing volume defined as the volume over which fracing slurry or specifically proppant has been successfully delivered to the subsurface structure of interest. There are other parameters that will prove useful to the operator such as the time and the speed that the fluid and proppant progresses through the subsurface structure of interest. Information relating to the fluid movement in and out of the subsurface structure of interest will provide a measurement of the full extent of the proppant and its location.

The data presented indicates that fracing stages often do not perform as modeled or expected from field experience. In addition a frac stage can frac to one side or another preferentially. This leads to the concept of using a resettable plug that can be placed over the perforations created for the frac, in such a way as to force the frac in one direction, against the natural route due to hydraulic changes or stress profile changes caused by earlier fracing stages. In this arrangement the frac stage would be done twice, once for one side and then a second time for the other side of the stage. This will be of special use in fracing operations in a field containing down spaced wells.

The data presented shows that fluid in a fracing operation often extends further than the proppant or slurry. In many cases the data has shown that fluid moves out into the structure of interest but then retracts. However, when proppant also moves in the structure of interest the signal detected remains in place. By noting the furthest extent of the response and then the distance to which the signal subsides the operator can determine the full extent of the proppant and so get an indication of the expected producing volume created by the fracing.

The proppant is also detected through the process of doping the proppant material with another material that is electrically conductive such as graphite. It is envisioned that the fracing operation would pump doped sand at the start of the operation and then convert to normal sand. The doped sand will show the furthest extent of the proppant by causing a high contrast boundary to appear in the fluid plume.

An alternate embodiment envisions multiple time periods over which the doped proppant is pumped but at incrementally diminishing concentrations, allowing the identification of the most efficient rate for pumping and to what extent to pump.

Another embodiment provides different concentrations at different hydraulic fracturing locations, thus providing for additional delineation between the reflected signals from the hydraulic frac.

Graphite or other conductive material can also be pumped with, but not doped on the sand.

In another embodiment, the operator may adjust the conductivity of the fluid during the hydraulic fracturing operation. This provides different impedance contrasts at different times during the operation indicating how the fluid is transported into the formation and when. Since the frac operation involves multiple steps, an understanding of the best approach to frac the structure interest can be achieved.

Consider now the case of flow back monitoring. The techniques described herein are very sensitive to the passage of subsurface impedance interfaces as described herein, and this allows for monitoring of a flow back operation. Not all the fracing locations act in the same way during flow back. It is likely that some frac channels will have delayed response and will not produce all the fluid from the formation that was added during a fracing operation. Having knowledge of this will change the way in which subsequent operations are planned and designed. An example of this would be the plan for an EOR operation.

Consider now the case of an EOR operation. The techniques described herein are very sensitive to the passage of subsurface impedance interfaces as described herein, and this allows for monitoring of an EOR operation. Not all frac'd stages produce in the same way. The techniques, systems and methods described herein enable the operator to view directly which frac'd channels are producing and adjust the operation accordingly. This may result in increased efficiency and greater overall production of the subsurface structure of interest. The data indicates that the system may be sensitive to changes in the phase of fluid and gas within the subsurface structure of interest. Phase is as understood in the field of fluid dynamics.

EOR operations across multiple stages of a lateral well can also act in such a way that stronger flowing stages can neck off weaker stages and prevent full production of the area. To neck off a stage basically is the action of reducing flow from a specific stage in the group of stages that make up a frac. The techniques described herein can detect this affect early in the operation and so may allow the operator to control which stage is active at any time in order to prevent the necking off affect.

Considering the case of long term reservoir monitoring. The oil/water interface or the oil/gas interface is of great importance to a long term production plan. This may be monitored directly with the techniques, systems and methods described herein.

The complete cycle of operations that occur during the life of an oil and gas well can be monitored and adjusted using the same equipment and techniques at each operational stage.

Any impedance interface where one material has a different impedance than another, whether caused by active intervention or the natural progression of a subsurface structure of interest, can be monitored and imaged with this technique.

In a further alternate embodiment the data is able to detect a broadband electromechanical effect that occurs with the onset of a subsurface crack in the subsurface structure of interest as a result of the fracing operation. Due to the extremely accurate timing available in the system the data can show how the cracks progress in time past the receivers.

Another embodiment uses the discontinuity found in the cross correlation data that indicates a broadband shift in the times at which reflections are received as a result of subsurface crack propagation and also after the fracing has finished, as cracks close where there is no proppant present to prop the cracks open once surface generated overburden pressure is released.

There are at least three processes involved in the results received. Data is received as a result of the reflections/refractions of the transmitted energy from the fluid plume and/or the proppant as it is being injected into the subsurface formation. Once the hydraulic fracturing has completed the changed reflectivity remains where fluid and proppant remain in the sub surface formation. Since the total energy returned increases at the receivers local to the hydraulic fracturing location, signals in other parts of the system would reasonably be expected to reduce.

Data may also be received that is generated by the formation as a result of a spontaneous electromechanical voltages generated from the cracking that occurs in the rock. This data is not coherent with the transmitted data and appears at the receivers in conjunction with sub surface pressure data that indicates cracking is occurring.

Data may be received that indicates a timing shift in all subsequent received data caused by a deformation of the subsurface structure during the fracturing operation. This is very pronounced in the cross correlation data.

Since the data depicts the response in the amplitude ratio as an increase in total energy received, there are several possible explanations for this counter intuitive response as follows.

One explanation for this result is that the response is dominated by the very high resistivity properties of the proppant. Therefore controlling the resistivity value of the proppant by doping or coating it with a lower resistivity material to closely match the conductivity of the fluid may allow the system to select to resolve fluid location only or proppant location only or some combination of both.

Another explanation is that the response is caused by a lensing effect. As the fluid is introduced a new reflective volume is carved out in the structure that causes energy that was previously distributed over a larger energy to be concentrated in the direction of the surface receivers above the subsurface hydraulic fracturing location.

Another possible explanation is that the reduction in resistivity within the subsurface structure allows the transmitter signal to travel past the formation allowing larger responses from formations further down the lithology. Cross correlation data shows an increase in other responses after the hydraulic fracturing starts with a co-incident reduction in reflectivity from other parts of the plotted data.

What is claimed is:

1. A machine readable medium, on which are stored instructions, comprising instructions that when executed cause a machine to:
   analyze a secondary field of a designed waveform received by a receiver of a controlled source electromagnetic system from a subsurface area of interest; and
   indicate changes in impedance of structures in the subsurface area of interest contemporaneously with the changes, responsive to the analysis.

2. The machine readable medium of claim 1, further comprising instructions that when executed cause the machine to:
   detect a contrast boundary in a fluid plume in the secondary field of the designed waveform.

3. The machine readable medium of claim 1, further comprising instructions that when executed cause the machine to:
   identify an efficient pumping rate and extent responsive to indicated changes in impedance of the structures in the subsurface area of interest.

4. The machine readable medium of claim 1, further comprising instructions that when executed cause the machine to:
   determine in the subsurface area of interest, responsive to the analysis of the secondary field of the designed waveform one or more of:
   a half fracing length;
   a fracing height; and
   a fracing volume.

5. The machine readable medium of claim 1, further comprising instructions that when executed cause the machine to:
   monitoring and imaging an impedance interface in the subsurface area of interest responsive to the analysis of the secondary field of the designed waveform.

6. The machine readable medium of claim 1, further comprising instructions that when executed cause the machine to:
   detect electromechanical voltages in signals received by the receiver of the controlled source electromagnetic system generated from cracking in the subsurface area of interest, wherein the electromechanical voltages are not coherent with the designed waveform transmitted by a transmitter of the controlled source electromagnetic system.

7. The machine readable medium of claim 1, further comprising instructions that when executed cause the machine to:
   detect a timing shift in the secondary field of the designed waveform caused by a deformation of structures in the subsurface area of interest.

8. The machine readable medium of claim 1, further comprising instructions that when executed cause the machine to:
   resolve location of a hydraulic fracturing fluid independent of a location of a proppant material in the subsurface area of interest.

9. The machine readable medium of claim 1, further comprising instructions that when executed cause the machine to adjust a forward model of the subsurface area of interest.

10. A method of determining movement of subsurface fluid, gasses, or solids in a subsurface area of interest, comprising:
    analyzing a secondary field of a designed waveform received by a receiver of a controlled source electromagnetic system; and
    indicating changes in impedance of structures in the subsurface area of interest contemporaneously with the changes, responsive to the analysis.

11. The method of claim 10, further comprising detecting a contrast boundary in a fluid plume in the secondary field of the designed waveform.

12. The method of claim 10, further comprising identifying an efficient pumping rate and extent responsive to indicated changes in impedance of the structures in the subsurface area of interest.

13. The method of claim 10, further comprising:
    determining in the subsurface area of interest, responsive to the analysis of the secondary field of the designed waveform, one or more of:
    a half fracing length;
    a fracing height; and
    a fracing volume.

14. The method of claim 10, further comprising monitoring and imaging an impedance interface in the subsurface area of interest responsive to the analysis of the secondary field of the designed waveform.

15. The method of claim 10, further comprising detecting electromechanical voltages in signals received by the receiver of the controlled source electromagnetic system generated from cracking in the subsurface area of interest, wherein the electromechanical voltages are not coherent with the designed waveform transmitted by a transmitter of the controlled source electromagnetic system.

16. The method of claim 10, further comprising detecting a timing shift in the secondary field of the designed waveform caused by a deformation of structures in the subsurface area of interest.

17. The method of claim 10, further comprising resolving a location of a hydraulic fracturing fluid independent of a location of a proppant material in the subsurface area of interest.

18. The method of claim 10, further comprising adjusting a forward model of the subsurface area of interest.

19. A controlled source electromagnetic system for determining movement of subsurface fluid, gasses, or solids in a subsurface structure of interest, comprising:
    a transmitter, configured to transmit a designed waveform;
    a plurality of receivers, configured to receive the designed waveform;
    an analysis unit configured to:
    analyze a secondary field of a designed waveform received by a receiver of a controlled source electromagnetic system; and
    indicate changes in impedance of structures in the subsurface area of interest contemporaneously with the changes, responsive to the analysis.

20. The controlled source electromagnetic system of claim 19, wherein the analysis unit is further configured to:
    determine in the subsurface area of interest, responsive to the analysis of the secondary field of the designed waveform one or more of:
    a half fracing length;
    a fracing height; and
    a fracing volume.

* * * * *